United States Patent
Wilton et al.

(10) Patent No.: US 8,795,116 B1
(45) Date of Patent: Aug. 5, 2014

(54) AUTOMATIC TRANSMISSION WITH INTEGRATED ENGINE STARTER, REMOTE MOUNTED PUMP AND DRIVE SYSTEM

(71) Applicant: GM Global Technology Operations LLC, Detroit, MI (US)

(72) Inventors: Daryl A. Wilton, Macomb, MI (US); James M. Hart, Belleville, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 24 days.

(21) Appl. No.: 13/755,696

(22) Filed: Jan. 31, 2013

(51) Int. Cl.
*F16H 3/72* (2006.01)

(52) U.S. Cl.
USPC .............................................. 475/5

(58) Field of Classification Search
None
See application file for complete search history.

(56) References Cited

U.S. PATENT DOCUMENTS

| | | | |
|---|---|---|---|
| 6,176,803 B1 | 1/2001 | Meyer et al. | |
| 6,984,187 B2 | 1/2006 | Biermann | |
| 6,991,578 B2 | 1/2006 | Ziemer | |
| 7,011,597 B2 | 3/2006 | Haka | |
| 7,018,319 B2 | 3/2006 | Ziemer | |
| 8,485,929 B2 * | 7/2013 | Wust | 475/5 |
| 8,602,934 B2 * | 12/2013 | Mellet et al. | 475/5 |
| 8,696,506 B2 * | 4/2014 | Kaltenbach et al. | 475/5 |

* cited by examiner

*Primary Examiner* — Dirk Wright

(57) ABSTRACT

An automatic transmission includes a plurality of planetary gear assemblies, an integrated starter, a remote mounted hydraulic pump and a common drive system. An input shaft of the automatic transmission is coupled to and drives a ring (spur) gear. In one portion of the automatic transmission, a starter motor is disposed and includes gear teeth on an output shaft that engage a pinion gear that, in turn, engages the input shaft ring gear. In another portion of the automatic transmission, preferably the lower portion, an off axis hydraulic pump includes a drive shaft and driven gear which also engages the input shaft ring gear.

20 Claims, 5 Drawing Sheets

| Gear State | Brakes | | | | Clutches | |
|---|---|---|---|---|---|---|
| | 62 | 64 | 66 | 68 | 74 | 72 |
| REV | X | | | X | | |
| N | | | | O | | |
| 1ST | | X | | X | | |
| 2ND | | | | X | | X |
| 3RD | | X | | | | X |
| 4TH | | | X | | | X |
| 5TH | X | | | | | X |
| 6TH | | | | | X | X |
| 7TH | X | | | | X | |
| 8TH | | | X | | X | |
| 9TH | | X | | | X | |

X = ON - Engaged Carrying Torque
O = ON - Engaged Not Carrying Torque

AUTOMATIC TRANSMISSION WITH INTEGRATED ENGINE STARTER, REMOTE MOUNTED PUMP AND DRIVE SYSTEM

FIELD

The present disclosure relates to automatic transmissions for motor vehicles and more particularly to automatic transmissions having either or both an integrated engine (prime mover) starter, a remote mounted pump and a drive system.

BACKGROUND

The statements in this section merely provide background information related to the present disclosure and may or may not constitute prior art.

Multiple speed automatic transmissions are the overwhelming transmission choice for purchasers of passenger cars, sport utility vehicles and light trucks.

In such a typical automatic transmission, a hydraulic pump provides pressurized hydraulic fluid (transmission oil) to a valve body containing a plurality of spool valves, solenoid valves and passageways which collectively direct properly sequenced flows of pressurized hydraulic fluid to a plurality of actuators associated with clutches and brakes. The mechanical portion of the automatic transmission includes a plurality of planetary gear assemblies which are (1) interconnected by permanent coupling members, (2) selectively interconnected by the friction clutches or (3) selectively grounded by the brakes. Specific combinations of the clutches and brakes are engaged or activated in sequence to provide a predetermined sequence of numerically related gear ratios and thus output speeds and torques.

Increasingly demanding efficiency, performance and economic goals continue to encourage automatic transmission research and development. Because they so closely match the power and torque outputs of an engine to vehicle speed and load, there has been of late both increased development of and consumer demand for six, seven and eight speed automatic transmissions which provide significant performance enhancements and fuel consumption reduction. Nonetheless, such transmissions are known to have drawbacks. Two known and related drawbacks are complexity which often manifests itself as increased size and cost. Because of their benefits, there is ongoing development efforts directed to further improvements in automatic transmissions. The present invention provides such further improvements in automatic transmissions.

SUMMARY

The present invention provides an automatic transmission having an integrated starter, a remote mounted hydraulic pump and a common drive system. An input shaft of the automatic transmission is coupled to and drives a ring (spur) gear. In one portion of the automatic transmission, a starter motor is disposed and includes gear teeth on an output shaft that engage a pinion gear that, in turn, engages the input shaft ring gear. In another portion of the automatic transmission, preferably the lower portion, an off axis hydraulic pump includes a drive shaft and driven gear which also engages the input shaft ring gear. It will thus be appreciated that both the starter motor and the hydraulic pump are always driven by the input shaft ring gear. The starter motor, hydraulic pump and common drive may be incorporated into many transmission configurations and a preferred transmission configuration is also disclosed.

It is thus an aspect of the present invention to provide an automatic transmission having an integrated starter motor.

It is a further aspect of the present invention to provide an automatic transmission having an integrated starter motor and a gear train between its output shaft and the transmission input shaft.

It is a still further aspect of the present invention to provide an automatic transmission having a remote mounted hydraulic pump and drive assembly.

It is a still further aspect of the present invention to provide an automatic transmission having a remote mounted, off axis hydraulic pump and drive assembly.

It is a still further aspect of the present invention to provide an automatic transmission having an integrated starter motor and a remote mounted hydraulic pump and drive assembly.

It is a still further aspect of the present invention to provide an automatic transmission having an integrated starter motor and a remote mounted hydraulic pump and common gear drive assembly.

It is a still further aspect of the present invention to provide an automatic transmission having a starter motor which is mounted on an axis which is offset from and parallel to the axis of the transmission input shaft.

It is a still further aspect of the present invention to provide an automatic transmission having a hydraulic pump which is mounted on an axis which is offset from and parallel to the axis of the transmission input shaft.

It is a still further aspect of the present invention to provide an automatic transmission having a starter motor and hydraulic pump which always rotate with the transmission input shaft.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
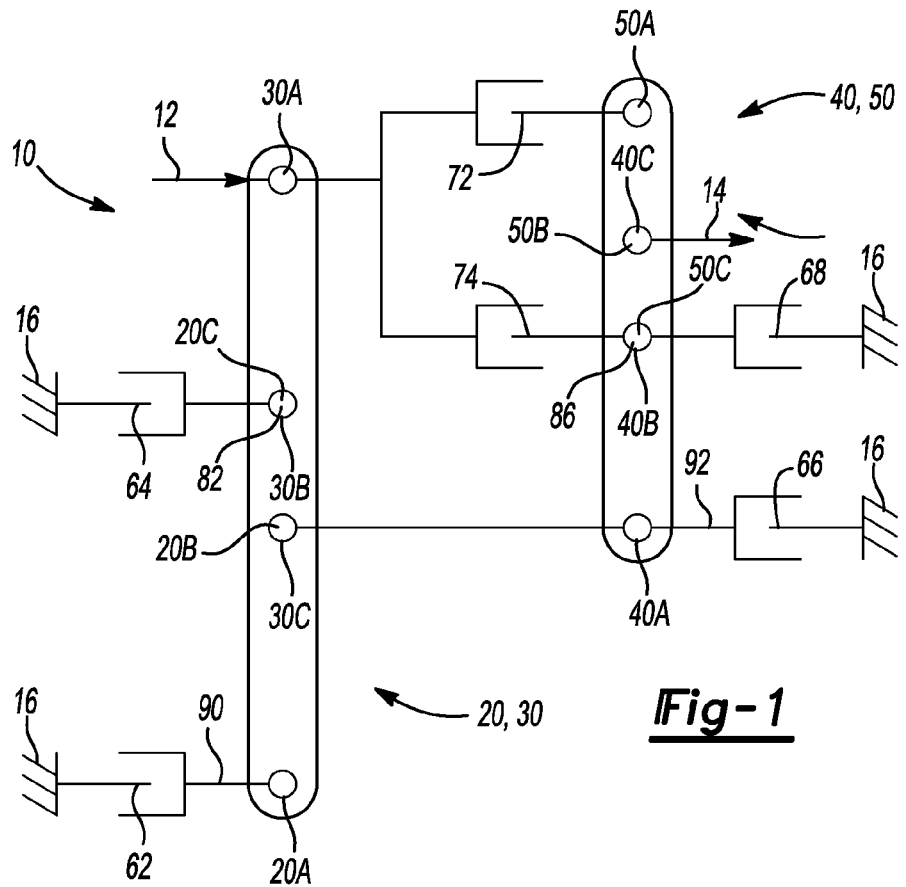
FIG. 1 is a lever diagram of multiple speed automatic transmission suitable for use with the present invention having two four node levers.

Referring now to FIG. 1, a lever diagram of an exemplary automatic transmission 10 with which the present invention may be utilized is illustrated. A lever diagram is a schematic representation of the components of an automatic transmission wherein a planetary gear assembly is represented by a vertical bar or lever and the components of the planetary gear assemblies such as sun gears, planet gear carriers and ring gears are represented by nodes. The relative lengths of the vertical bars between the nodes represent the ratios between the components. Where a component of one planetary gear assembly is coupled directly to a component of another planetary gear assembly, two levers may be combined into a single lever having, in this instance, four nodes. Because of such direct coupling, the four planetary gear assemblies of a transmission may be represented by only two vertical bars or levers as in FIG. 1. Mechanical couplings or interconnections between the nodes of the planetary gear assemblies are represented by horizontal lines and torque transmitting devices such as friction clutches and brakes are represented by interleaved or nested fingers. Further explanation of the format, purpose and use of lever diagrams can be found in SAE Paper No. 810102 entitled, "The Lever Analogy: A New Tool in Transmission Analysis" by Benford and Leising which is fully incorporated herein by reference.

The multiple speed automatic transmission 10 includes an input shaft or member 12 which receives drive torque, an output shaft or member 14 which delivers drive torque and a housing 16 which is referred to as "ground" with reference to FIG. 1. The automatic transmission 10 also includes four planetary gear assemblies. A first planetary gear assembly 20 includes a first node 20A, a second node 20B and a third node 20C. A second planetary gear assembly 30 includes a first node 30A which is coupled to and driven by the input shaft or member 12, a second node 30B which is common with the third node 20C of the first planetary gear assembly 20 and a third node 30C which is common with the second node 20B of the first planetary gear assembly 20. A third planetary gear assembly 40 includes a first node 40A, a second node 40B and a third node 40C which is coupled to and drives the output shaft or member 14. Finally, a fourth planetary gear assembly 50 includes a first node 50A, a second node 50B which is common with the third node 40C of the third planetary gear assembly 40 and thus also drives the output shaft or member 14 and a third node 50C which is common with the second node 40B of the fourth planetary gear assembly 40.

Additionally, the automatic transmission 10 includes a plurality of selectively engageable torque transmitting devices, namely, brakes and clutches. As utilized herein, the term "brake" or "friction brake" refers to any torque transmitting device having a first plurality of rotatable friction plates or discs which are interleaved with a second, stationary plurality of plates or discs and which are compressed by an associated operator or actuator to ground or brake the rotating plates or discs to the housing 16. The term "clutch" or "friction clutch" refers to a similar device in which the first and second pluralities of interleaved friction plates or discs transmit torque between two rotatable members. It should be understood, however, that other brake and clutch types and configurations are within the purview of this invention.

A first friction brake 62 is operably disposed between the first node 20A of the first planetary gear assembly 20 and ground (the housing 16). A second friction brake 64 is operably disposed between the third node 20C of the first planetary gear assembly 20 (and the second node 30B of the second planetary gear assembly 30) and ground (the housing 16). A third friction brake 66 is operably disposed between the first node 40A of the third planetary gear assembly 40 and ground (the housing 16). A fourth friction brake 68 is operably disposed between the second node 40B of the third planetary gear assembly (and the third node 50C of the fourth planetary gear assembly 50) and ground (the housing 16).

A first friction clutch 72 is operably disposed between the first node 30A of the second planetary gear assembly 30 and the first node 50A of the fourth planetary gear assembly 50. A second friction clutch 74 is operably disposed between the first node 30A of the second planetary gear assembly 30 and the second node 40B of the third planetary gear assembly 40 (and the third node 50C of the fourth planetary gear assembly 50).

Figure 2:
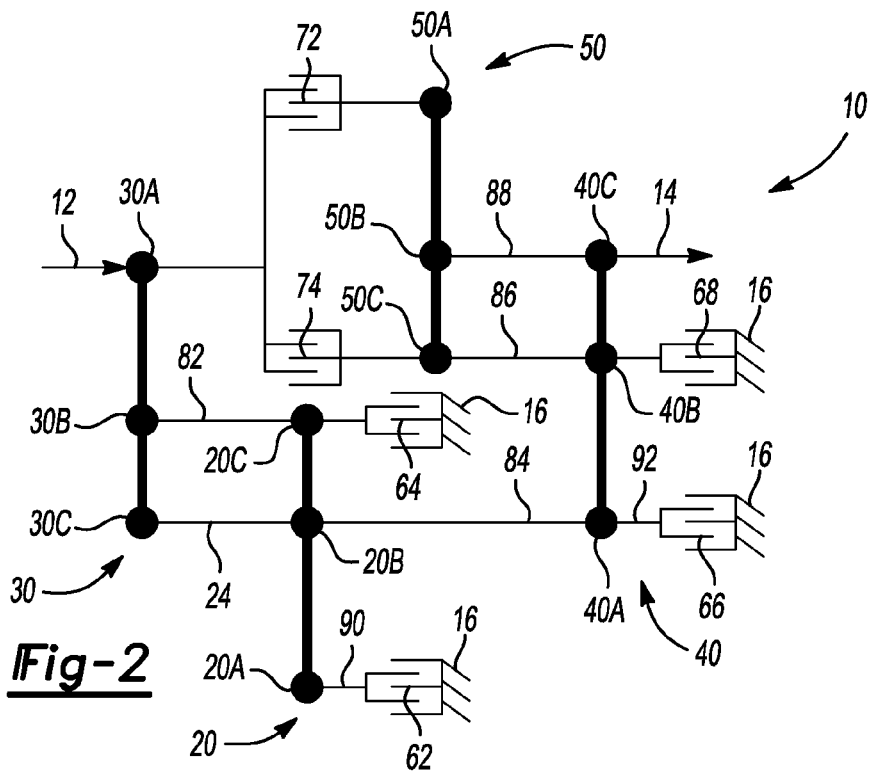
FIG. 2 is a lever diagram of a multiple speed automatic transmission suitable for use with the present invention having four three node levers.
Figures 3, 4:
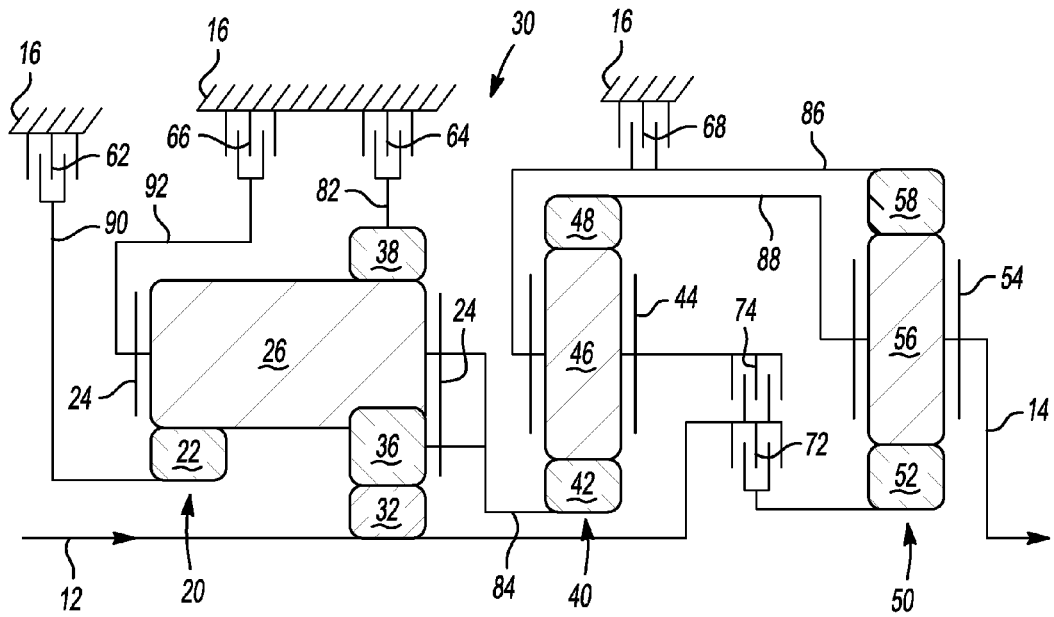
FIG. 3 is a stick diagram of an embodiment of a multiple speed automatic transmission suitable for use with the present invention.
FIG. 4 is a truth table presenting the various combinations of engaged brakes and clutches which achieve a given forward or reverse gear or speed ratio and provide multiple forward speeds and reverse in an automatic transmission suitable for use with the present invention.

Referring now to FIGS. 1, 2 and 3, there are also a plurality of fixed, i.e., positive or direct, connections or couplings between various components of the planetary gear assemblies 20, 30, 40 and 50. Because the first planetary gear assembly 20 and the second planetary gear assembly 30 are combined in a single lever in FIG. 1 and the third planetary gear assembly 40 and the fourth planetary gear assembly 50 are also combined in a single lever in FIG. 1, many of the fixed connections are contained within or are integral components of certain nodes. Accordingly, many of the fixed connections are only clearly visible in FIGS. 2 and 3.

A first shaft, quill or member 82 connects the third node 20C of the first planetary gear assembly 20 to the second node 30B of the second planetary gear assembly 30. A second shaft, quill or member 84 connects the second node 20B of the first planetary gear assembly 20 (and the third node 30C of the second planetary gear assembly 30) to the first node 40A of the third planetary gear assembly 40. A third shaft, quill or member 86 connects the second node 40B of the third planetary gear assembly 40 to the third node 50C of the fourth planetary gear assembly 50. A fourth shaft, quill or member 88 connects the third node 40C of the third planetary gear assembly 40 to the second node 50B of the fourth planetary gear assembly 50. Because of the layout of the components in the automatic transmission 10, two additional fixed connections such as shafts, quills or members may be utilized. A fifth shaft, quill or member 90 connects the first friction brake 62 to the first node 20A of the first planetary gear assembly 20 and a sixth shaft, quill or member 92 connects the first node 40A of the third planetary gear assembly 40 to the third friction clutch 66.

Referring now to FIG. 2, a lever diagram of an automatic transmission 10 according to the present invention having four three node levers is illustrated. The first planetary gear assembly 20 includes the first node 20A, the second node 20B and the third node 20C. The second planetary gear assembly 30 includes the first node 30A which is coupled to the input shaft or member 12, the second node 30B and the third node 30C. The third planetary gear assembly 40 includes the first node 40A, the second node 40B and the third node 40C which is coupled to and drives the output shaft or member 14. Finally, the fourth planetary gear assembly 50 includes the first node 50A, the second node 50B and the third node 50C.

The automatic transmission 10 also includes a plurality of selectively engageable torque transmitting devices, namely, brakes and clutches. The first friction brake 62 is operably disposed between the first node 20A of the first planetary gear assembly 20 and ground (the housing 16). The second friction brake 64 is operably disposed between the third node 20C of the first planetary gear assembly 20 and ground (the housing 16). The third friction brake 66 is operably disposed between the first node 40A of the third planetary gear assembly 40 and ground (the housing 16). The fourth friction brake 68 is operably disposed between the second node 40B of the third planetary gear assembly 40 and ground (the housing 16).

The first friction clutch 72 is operably disposed between the first node 30A of the second planetary gear assembly 30 and the first node 50A of the fourth planetary gear assembly 50. The second friction clutch 74 is operably disposed between the first node 30A of the second planetary gear assembly 30 and the third node 50C of the fourth planetary gear assembly 50.

The first shaft, quill or member 82 connects the third node 20C of the first planetary gear assembly 20 to the second node 30B of the second planetary gear assembly 30. A connection between the second node 20B of the first planetary gear assembly 20 and the third node 30C of the second planetary gear assembly 30 is accomplished by a common, elongate planet gear carrier 24 (illustrated in FIG. 3). The second shaft, quill or member 84 connects the second node 20B of the first planetary gear assembly 20 to the first node 40A of the third planetary gear assembly 40. A third shaft, quill or member 86 connects the second node 40B of the third planetary gear assembly 40 to the third node 50C of the fourth planetary gear assembly 50. A fourth shaft, quill or member 88 connects the third node 40C of the third planetary gear assembly 40 to the second node 50B of the fourth planetary gear assembly 50. Because of the layout of the components in the automatic transmission 10, two additional fixed connections such as shafts, quills or members may be utilized. A fifth shaft, quill or member 90 connects the first friction brake 62 to the first node 20A of the first planetary gear assembly 20 and a sixth shaft, quill or member 92 connects the first node 40A of the third planetary gear assembly 40 to the third friction clutch 66.

In FIG. 3, the various levers of FIGS. 1 and 2 have been replaced by one partial, one compound and two simple planetary gear assemblies 20, 30, 40 and 50 and the nodes 20A, 20B, 20C, 30A, 30B, 30C, 40A, 40B, 40C, 50A, 50B and 50C have been replaced by the components of the four planetary gear assemblies 20, 30, 40, and 50, namely, sun gears, planetary gear carriers having planet gears and ring gears. The first, partial planetary gear assembly 20 includes a first sun gear 22. the first, elongate planet gear carrier 24 having a first plurality of elongate planet gears 26, one of which is illustrated in FIG. 3. The first plurality of elongate planet gears 26 are rotatably disposed on stub shafts and/or bearings (not illustrated). One end of each of the first plurality of elongate planet gears 26 is in constant mesh with the first sun gear 22. The second, compound planetary gear assembly 30 includes a second sun gear 32, a portion of the first elongate planet gear carrier 24 including the first plurality of elongate planet gears 26, a second plurality of planet gears 36, one of which is illustrated in FIG. 3, and a second ring gear 38. The second plurality of planet gears 36 are rotatably disposed on stub shafts and/or bearings (not illustrated) and are in constant mesh with the second sun gear 32. Another end of each of the first plurality of elongate planet gears 26 is in constant mesh with a respective one of the second plurality of planet gears 36 and the second ring gear 38.

The third, simple planetary gear assembly 40 includes a third sun gear 42, a third planet gear carrier 44 and a third ring gear 48. Rotatably disposed in the third planet gear carrier 44 on stub shafts and/or bearings (not illustrated) are a plurality of third planet gears 46, one of which is illustrated in FIG. 3. Each of the plurality of third planet gears 46 is in constant mesh with the third sun gear 42 and the third ring gear 48. The fourth, simple planetary gear assembly 50 includes a fourth sun gear 52, a fourth planet gear carrier 54 and a fourth ring gear 58. Rotatably disposed in the fourth planet gear carrier 54 on stub shafts and/or bearings (not illustrated) are a plurality of fourth planet gears 56, one of which is illustrated in FIG. 3. Each of the plurality of fourth planet gears 56 is in constant mesh with the fourth sun gear 52 and the fourth ring gear 58.

The first friction brake 62 is connected between the housing 16 and the first sun gear 22 of the first planetary gear assembly 20 by the fifth shaft, quill or member 90. The second friction brake 64 is connected between the housing 16 and the second ring gear 38 of the second planetary gear assembly 30 by the first shaft, quill or member 82. The third friction brake 66 is connected between the housing 16 and the first planet gear carrier 24 of the first planetary gear assembly 20 by the sixth shaft, quill or member 92. The fourth friction brake 68 is connected between the housing 16 and the third planet gear carrier 44 of the third planetary gear assembly 40 and the fourth ring gear 58 of the fourth planetary gear assembly 50 by the third shaft, quill or member 86.

The input shaft 12 is connected to and drives the second sun gear 32 of the second planetary gear assembly 30, the first friction clutch 72 and the second friction clutch 74. The first friction clutch 72 is also connected to the fourth sun gear 52 of the fourth planetary gear assembly 50. The second friction clutch 74 is connected to the third planet gear carrier 44 of the third planetary gear assembly 40 and to the fourth ring gear 58 of the fourth planetary gear assembly 50 by the third shaft, quill or member 86.

The second shaft, quill or member 84 connects the first planet gear carrier 24 of the first planetary gear assembly 20 to the third sun gear 42 of the third planetary gear assembly 40. The fourth shaft, quill or member 88 connects the third ring gear 48 of the third planetary gear assembly 40 to the fourth planetary gear carrier 54 of the fourth planetary gear assembly 50 which is also connected to the output shaft 14.

FIG. 4 is a truth table which presents the various combinations of engaged brakes 62, 64, 66 and 68 and clutches 72 and 74 which achieve a given forward or reverse gear or speed ratio and provide multiple forward speeds and reverse in the automatic transmission 10 which incorporates the present invention. An "X" in a column indicates that the referenced clutch or brake is engaged and carrying torque in the referenced gear and an "0" in the column for the brake 68 indicates that it is engaged but not carrying torque in neutral. Upshifts are accomplished by releasing the clutches and brakes engaged in a lower gear and engaging the clutches and brakes of the new (higher) gear. Clutches and brakes engaged in both the lower gear and the new (higher) gear remain engaged during the shift. Downshifts are achieved in reverse fashion but may skip one or more gears depending on operational rules and driver input.

Figure 5:
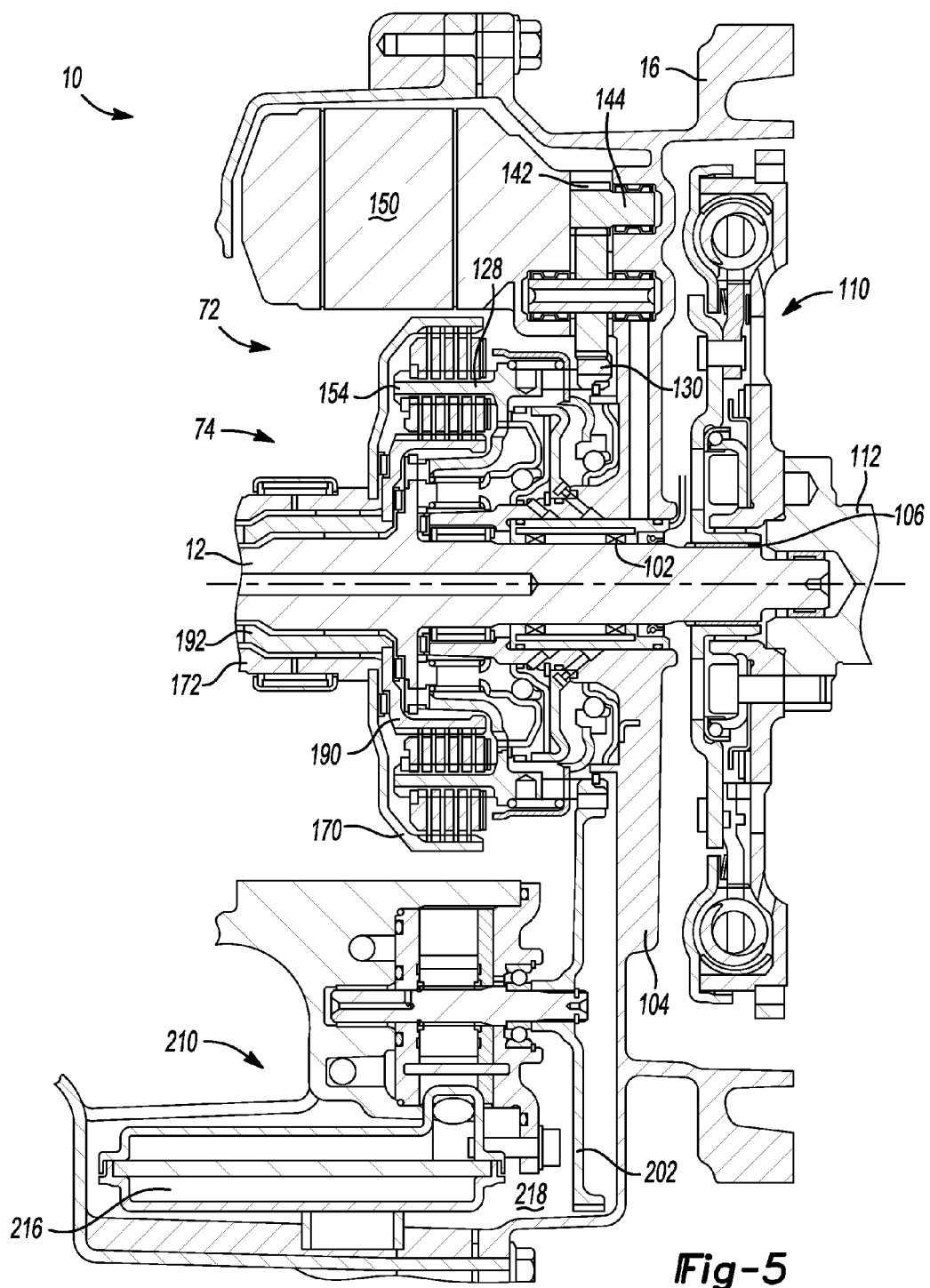
FIG. 5 is a full sectional view of a forward portion of an automatic transmission incorporating the present invention.
Figure 6:
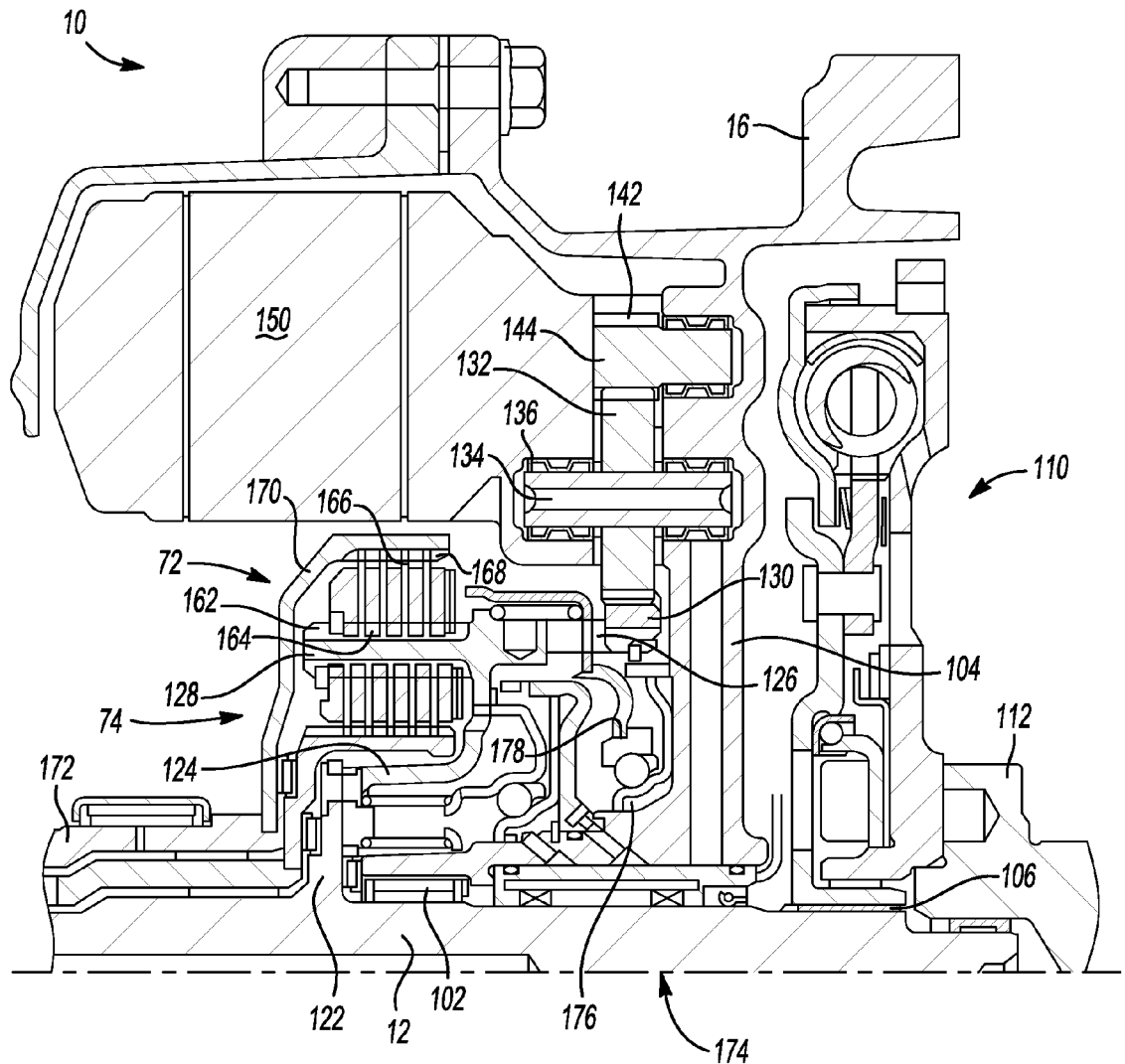
FIG. 6 is an enlarged, fragmentary, sectional view of a forward, upper portion of an automatic transmission illustrating the integrated starter motor.

With reference to FIGS. 5 and 6, a forward portion of the automatic transmission 10 adapted and intended for use in a motor vehicle is illustrated. The automatic transmission 10 includes the housing 16 which is preferably fabricated of metal and surrounds, protects and locates various components of the transmission 10. One such component is the transmission input shaft 12 that is rotatably supported on a plurality of roller bearings 102 in a web or bulkhead 104 within the housing 16. The transmission input shaft 12 is driven through an interengaging spline set 106 by a damper assembly 110 which, in turn, is driven by an engine output shaft 112. The engine (not illustrated) may be a gasoline, Diesel, flex fuel, hybrid or electric prime mover.

The transmission input shaft 12 includes a radially extending flange or circular projection 122 which is coupled to an intermediate collar or hub 124. The intermediate collar or hub 124 may be a unitary component or, typically for reasons of manufacture, one comprising multiple parts. The collar or hub 124 includes a forward portion or annulus 126 (extending to the right in FIGS. 5, 6 and 7) and a rearward portion or annulus 128 (extending to the left in FIGS. 5, 6 and 7). The forward portion 126 of the collar or hub 124 is terminated by an input ring gear 130. The axis of rotation of the input ring gear 130 is, of course, the axis of the transmission input shaft 12. Engaging the input ring gear 130 is a pinion or idler gear 132 that is disposed upon a stub shaft 134 which is rotatably mounted within the web or bulkhead 104 on a pair of anti-friction bearings such as ball or roller bearing assemblies 136. The pinion gear 132 is in constant engagement with gear teeth 142 on an output shaft 144 of a starter motor 150. It will thus be appreciated that the starter motor 150 is coupled to the transmission input shaft 12 through the gears 130 and 132 and the gear teeth 142 and thus always rotates when the transmission input shaft 12 is rotating.

The rearward portion 128 of the collar or hub 124 defines an annulus 154 that functions as an input member to a pair of friction clutch assemblies 72 and 74. The first (outer) friction clutch assembly 72 includes an outer splined surface 162 on the annulus 154 to which a first plurality of smaller diameter friction clutch plates or discs 164 are splined and thus rotationally coupled. The first plurality of friction clutch plates or discs 164 are interleaved with a second plurality of larger friction clutch plates or discs 166 which are coupled by splines 168 to a first clutch housing 170. The first clutch housing 170 is, in turn, coupled to a first quill or tubular member 172 which drives components within the automatic transmission 10. A first hydraulic actuator assembly 174 includes seals 176 and an annular piston and linkage 178 which engages and compresses the interleaved clutch plates or discs 164 and 166 to transmit torque therethrough.

Figure 7:
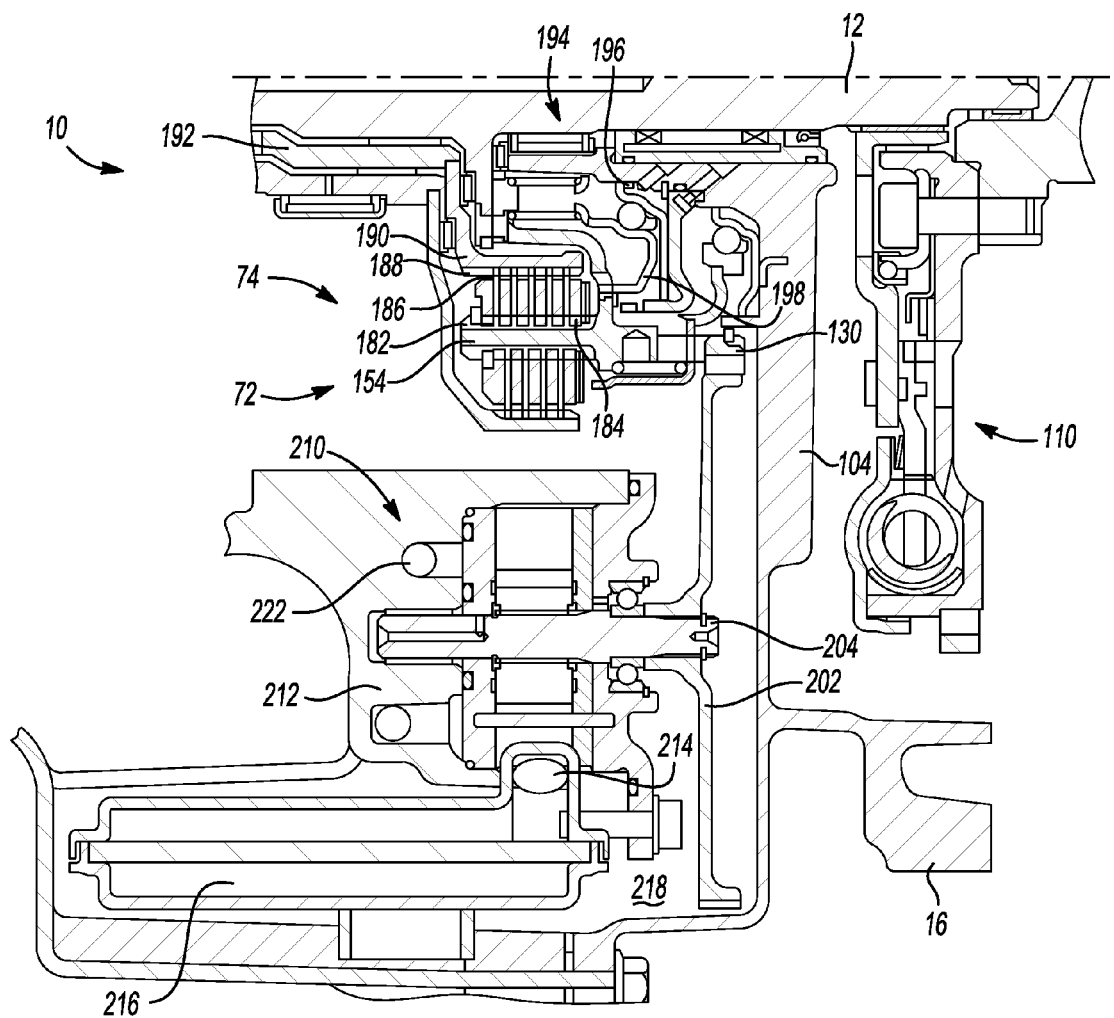
FIG. 7 is an enlarged, fragmentary, sectional view of a forward, lower portion of an automatic transmission illustrating the hydraulic pump assembly.

Referring now to FIGS. 5 and 7, the second (inner) friction clutch assembly 74 includes an inner splined surface 182 on the annulus 154 to which a first plurality of larger diameter friction clutch plates or discs 184 are splined and thus rotationally coupled. The first plurality of friction clutch plates or discs 184 are interleaved with a second plurality of smaller friction clutch plates or discs 186 which are coupled by splines 188 to a second clutch housing 190. The second clutch housing 190 is, in turn, coupled to a second quill or tubular member 192 which drives components within the automatic transmission 10. A second hydraulic actuator assembly 194 includes seals 196 and an annular piston and linkage 198 which engages and compresses the interleaved clutch plates or discs 184 and 186 to transmit torque therethrough.

As noted above, the forward portion 126 of the collar or hub 124 is terminated by the input ring gear 130. The axis of rotation of the input ring gear 130 is the axis of the transmission input shaft 12. Engaging the input ring gear 130, preferably in the lower portion of the automatic transmission 10, is a driven pump gear 202 which is secured to and rotates a pump input shaft 204 of a hydraulic pump assembly 210. The hydraulic pump assembly 210 may be, for example, a vane, gear or gerotor pump which includes a suitably configured housing 212 having one or more inlet or suction ports 214 which communicate with an intake filter 216 disposed in a sump 218 and one or more outlet or pressure ports 222 which supply pressurized hydraulic fluid to components of the automatic transmission 10.

It will be appreciated that the addition of the input ring gear 130 to the input shaft 12 of the automatic transmission 10 achieves the dual benefit of providing both a single power flow path for the electric starter motor 150 and the hydraulic pump assembly 210. In the case of the electric starter motor 150, starting power flows to the input shaft 12 of the transmission 10 and in the case of the hydraulic pump assembly 210, power flows to the pump assembly 210. It will thus be appreciated that maximum benefit from the present disclosure will be achieved by utilizing the input ring gear 130 with both the electric starter motor 150 and the hydraulic pump assembly 210 although either may be utilized independently and provide the attendant benefits.

Noteworthy benefits provided by utilization of the electric starter motor 150 configuration of the present invention include overall reduced transmission size, particularly the transmission center distance and accompanying weight and cost reductions. Since the starter gear teeth 142 and the idler or pinion gear 132 are in a wet (lubricated by transmission fluid) environment, they may be and are in constant mesh. Additionally, in engine start/stop configurations, the configuration provides faster response and quieter operation.

Noteworthy benefits which relate to the hydraulic pump assembly 210 include a configuration that does not increase the length of the transmission, flexibility of mounting location and a selectable pump input drive ratio. Additionally, because the pump 210 and the intake filter 216 are preferably disposed in the sump 218, there are no priming issues and the short suction line between the filter 216 and the inlet port 214 improves the efficiency of the pump 210. Finally, the typically low and off axis placement of the pump 210 results in a short supply line to the control system, e.g., the valve body.

The description of the invention is merely exemplary in nature and variations that do not depart from the gist of the invention are intended to be within the scope of the invention. Such variations are not to be regarded as a departure from the spirit and scope of the invention.

What is claimed is:

1. A multiple speed automatic transmission comprising, in combination,
    an input member,
    at least one input clutch having an input coupled to said input member and an output,
    a plurality of planetary gear assemblies, at least three of said planetary gear assemblies having at least three members,
    one of said plurality of planetary gear assemblies having one of said at least three members coupled to said output of said clutch and including a gear train engaging a starter motor and a hydraulic pump, and
    an output member coupled to one of said at least three members of another one of said plurality of planetary gear assemblies.

2. The multiple speed automatic transmission of claim 1 further including a plurality of torque transmitting devices selectively engageable to connect: one of said members of said one of said plurality of planetary gear assemblies to ground; another of said members of said one of said plurality of planetary gear assemblies and one of said members of yet another of said plurality of planetary gear assemblies to ground; another of said members of said yet another of said plurality of planetary gear assemblies to ground; and one of said members of another of said plurality of planetary gear assemblies and one of said members of still another of said plurality of planetary gear assemblies to ground.

3. The multiple speed automatic transmission of claim 1 wherein each of said at least three members of said plurality of planetary gear assemblies is one of a sun gear, a ring gear and a planet gear carrier.

4. The multiple speed automatic transmission of claim 1 wherein said one of said plurality of planetary gear assemblies is a compound planetary gear assembly and said one member of said compound planetary gear assembly is a sun gear, another member of said compound planetary gear assembly is a planet gear carrier and yet another member of said compound planetary gear assembly is a ring gear.

5. The multiple speed automatic transmission of claim 1 wherein said one member of said one of said plurality of planetary gear assemblies is a sun gear and wherein another of said members of said one of said plurality of planetary gear assemblies is selectively coupled to ground through a torque transmitting device.

6. The multiple speed automatic transmission of claim 1 wherein said one member of said another of said plurality of planetary gear assemblies is a planet gear carrier and wherein another member of said another of said plurality of planetary gear assemblies is selectively coupled to ground through a torque transmitting device.

7. A multiple speed automatic transmission comprising, in combination,
  a first, a second, a third and a fourth planetary gear assembly, each of said planetary gear assemblies having three members,
  an input member connected to one of said members of said second planetary gear assembly said input member including a gear assembly engaging a starter motor and a hydraulic pump,
  an output member connected to one of said members of said fourth planetary gear assembly,
  a first member for connecting one of said members of said first planetary gear assembly with another of said members of said second planetary gear assembly,
  a second member for connecting said another of said members of said second planetary gear assembly with one of said members of said third planetary gear assembly,
  a third member for connecting another member of said third planetary gear assembly with another of said members of said fourth planetary gear assembly,
  a fourth member for connecting yet another of said members of said third planetary gear assembly with said one of said members of said fourth planetary gear assembly, and
  a plurality of torque transmitting devices selectively engageable to connect: another of said members of said first planetary gear assembly to ground, said first connecting member to ground, yet another of said members of said second planetary gear assembly to ground, said third connecting member to ground, said input member to said yet another of said members of said fourth planetary gear assembly and said input member to said another of said members of said third planetary gear assembly.

8. The multiple speed automatic transmission of claim 7 wherein a first group of said plurality of torque transmitting devices are brakes and a second group of said plurality of torque transmitting devices are clutches.

9. The multiple speed automatic transmission of claim 7 wherein each of said three members of said first, second, third and fourth planetary gear assemblies is one of a sun gear, a ring gear and a planet gear carrier.

10. The multiple speed automatic transmission of claim 7 wherein said one member of said first planetary gear assembly is a planet gear carrier and said another member of said first planetary gear assembly is a sun gear.

11. The multiple speed automatic transmission of claim 7 wherein said one member of said second planetary gear assembly is a sun gear, said another member of said second planetary gear assembly is a planet gear carrier and said yet another member of said second planetary gear assembly is a ring gear.

12. The multiple speed automatic transmission of claim 7 wherein said one member of said third planetary gear assembly is a sun gear, said another member of said third planetary gear assembly is a planet gear carrier and said yet another member of said third planetary gear assembly is a ring gear.

13. The multiple speed automatic transmission of claim 7 wherein said one member of said fourth planetary gear assembly is a planet gear carrier, said another member of said fourth planetary gear assembly is a ring gear and said yet another member of said fourth planetary gear assembly is a sun gear.

14. The multiple speed automatic transmission of claim 7 wherein said second planetary gear assembly is a compound planetary gear assembly.

15. A multiple speed automatic transmission comprising, in combination,
  an input member having a drive gear coupled thereto,
  a starter motor assembly operably engaged by said drive gear,
  an output member,
  a first planetary gear assembly having a sun gear and an elongate planet gear carrier rotatably supporting a plurality of planet gears,
  a second planetary gear assembly having a sun gear coupled to said input member, said elongate planet gear carrier of said first planetary gear assembly including said plurality of planet gears and a ring gear,
  a third planetary gear assembly having a sun gear coupled to said elongate planetary gear carrier of said first and second planetary gear assembly, a planet gear carrier rotatably supporting a plurality of planet gears and a ring gear,
  a fourth planetary gear assembly having a sun gear, a planet gear carrier coupled to and driving said output member, coupled to said ring gear of said third planetary gear assembly and rotatably supporting a plurality of planet gears and a ring gear coupled to said planet gear carrier of said third planetary gear assembly.

16. The multiple speed automatic transmission of claim 15 further including a first friction brake disposed between said sun gear of said first planetary gear assembly and a housing, a second friction brake disposed between said ring gears of said first and said second planetary gear assemblies and said housing, a third friction brake disposed between said planet gear carrier of said first planetary gear assembly and said housing, and a fourth friction brake disposed between said planet gear carrier of said third planetary gear assembly and said ring gear of said fourth planetary gear assembly and said housing.

17. The multiple speed automatic transmission of claim 15 further including a first friction clutch disposed between said input member and said sun gear of said fourth planetary gear assembly and a second friction clutch disposed between said input member and said planet gear carrier of said third planetary gear assembly.

18. The multiple speed automatic transmission of claim 15 wherein said first, third and fourth planetary gear assemblies are simple planetary gear assemblies and said second planetary gear assembly is a compound planetary gear assembly.

19. The multiple speed automatic transmission of claim 15 wherein said starter motor assembly includes an output shaft having gear teeth and an idler gear engaging said gear teeth and said drive gear.

20. The multiple speed automatic transmission of claim 15 further including a hydraulic pump driven by said drive gear.

* * * * *